No. 734,003. PATENTED JULY 21, 1903.
S. SMITH.
TIRE SETTER AND COOLER.
APPLICATION FILED AUG. 18, 1902.
NO MODEL.

Witnesses
E. K. Stewart
J. H. Riley

S. Smith, Inventor.
by C. A. Snow & Co.
Attorneys

No. 734,003. Patented July 21, 1903.

UNITED STATES PATENT OFFICE.

SEBASTIAN SMITH, OF RUSHVILLE, ILLINOIS, ASSIGNOR OF ONE-HALF TO JOHN B. PRESTON, OF RUSHVILLE, ILLINOIS.

TIRE SETTER AND COOLER.

SPECIFICATION forming part of Letters Patent No. 734,003, dated July 21, 1903.

Application filed August 18, 1902. Serial No. 120,098. (No model.)

*To all whom it may concern:*

Be it known that I, SEBASTIAN SMITH, a citizen of the United States, residing at Rushville, in the county of Schuyler and State of Illinois, have invented a new and useful Tire Setter and Cooler, of which the following is a specification.

The invention relates to improvements in tire setters and coolers.

The object of the present invention is to improve the construction of tire setters and coolers, and to provide a simple, inexpensive, and efficient one of great strength and durability adapted to support a wheel in an elevated position above a tank to receive a heated tire and capable of enabling the wheel and tire to be quickly submerged for cooling the tire to cause the same to shrink and set on the wheel.

The invention consists in the construction and novel combination and arrangement of parts hereinafter fully described, illustrated in the accompanying drawings, and pointed out in the claims hereto appended.

Figure 1:
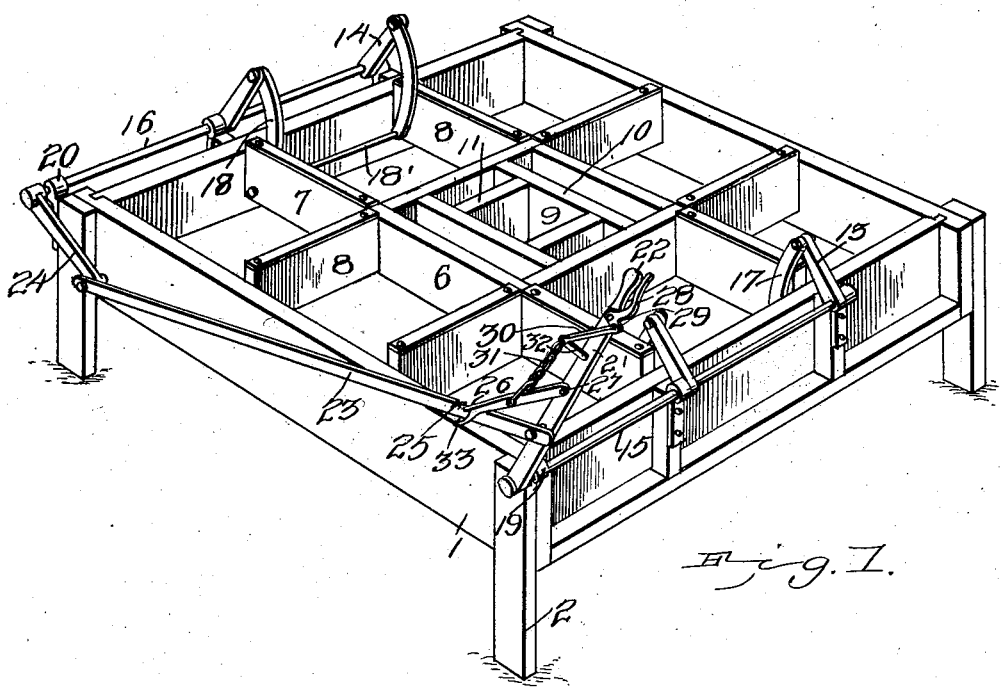
Figure 2:
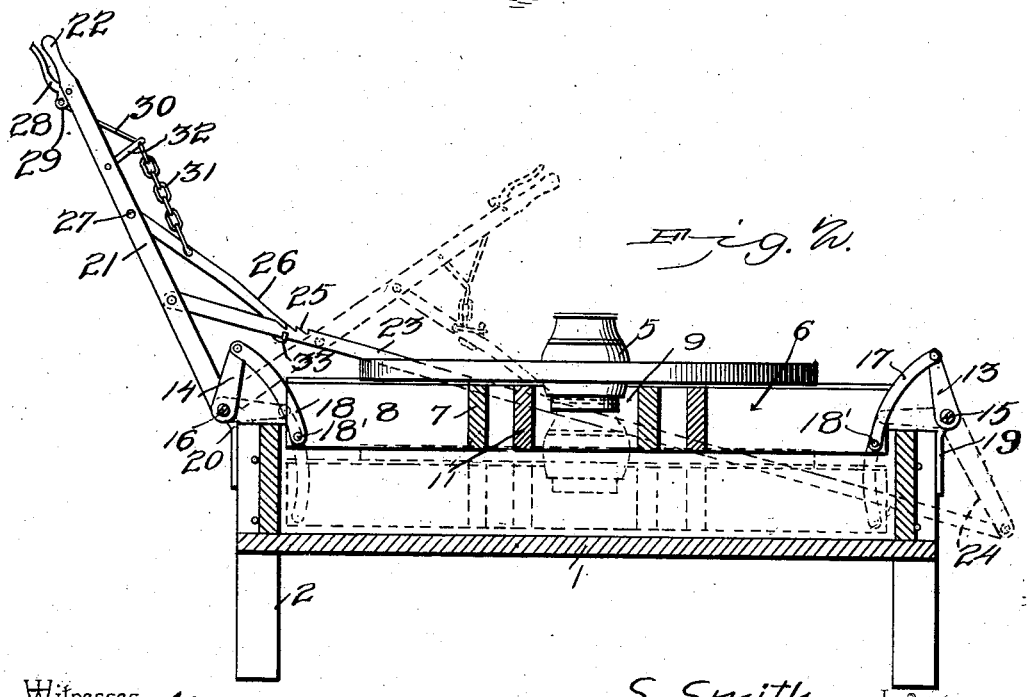

In the drawings, Figure 1 is a perspective view of a tire setter and cooler constructed in accordance with this invention. Fig. 2 is a sectional view of the same, the wheel-receiving frame or platform being shown elevated in full lines and lowered in dotted lines.

Like numerals of reference designate corresponding parts in both figures of the drawings.

1 designates a box or tank supported by legs 2 and designed to receive water for cooling a tire when the latter is placed on the wheel 5. The wheel 5 is supported in an elevated position over the tank on a vertically-movable rack or frame 6, which is composed of bars 7 and 8, arranged at right angles to each other and suitably secured together at the points of crossing and provided at their upper edges with metal strips or bars. The rack is also provided with a central hub-receiving opening 9, formed by parallel pieces 10 and 11, secured together and arranged as clearly shown in Fig. 1. The parallel pieces 10 extend across the space formed by the bars 7 and 8, and the other pieces 11 are secured between the parallel pieces 10 at opposite sides of the center of the rack. The wheel is placed on the rack with its hub arranged within the central opening or socket 9, as clearly shown in Fig. 2, and after a heated tire is applied to the wheel the rack is lowered by the means hereinafter described to submerge the heated tire.

The rack is connected at opposite sides with arms 13 and 14 of rock-shafts 15 and 16 by curved links 17 and 18, pivoted at their upper ends to the arms of the rock-shaft and similarly secured at their lower ends to the rack between the ends of the bars or members 7 by short rods 18'. The shafts 15 and 16 are journaled in suitable bearings 19 and 20 at opposite sides of the box or tank, and the shaft 15 is provided with an upwardly-extending operating arm or lever 21, terminating at its upper end in a handle or grip 22 and connected by a bar 23 with an arm 24 of the rock-shaft 16. The arm 24 of the rock-shaft 16 extends inward and downward at an inclination when the wheel-rack is in an elevated position, as illustrated in Fig. 1 of the drawings, and when the operating arm or lever 21 is swung inward the rock-shafts will be partially rotated to lower the rack and submerge the heated tire.

The connecting-bar 23 is provided at its upper edge with a series of notches 25, forming a ratchet and adapted to be engaged by a pawl 26, arranged at an inclination and pivoted at its upper end 27 to the operating arm or lever 21 and connected with a latch-lever 28. The latch-lever 28 is located near the handle or grip 22 and is provided with a short arm 29, which is connected by a link 30 with one end of a chain 31 and with an oscillating arm or link 32. The arm or link 32, which is pivoted at its inner end to the operating-lever 21, is connected at its outer end with the upper terminal of the chain, whereby when the latch-lever is pressed inward against the grip or handle 22 of the operating arm or lever the pawl or dog 26 will be lifted out of engagement with the ratchet of the connecting-bar. The pawl or dog is provided at its engaging end with a depending hook-shaped arm or extension 33, which passes around the lower edge of the connecting-bar and which prevents the pawl or dog from leaving the same. When the operating arm or lever of the rock-shaft 15 is swung outward from the position illustrated in dotted lines in Fig. 2 of the drawings, the short lifting-arms 13 and 14 of the rock-shafts will be swung upward to lift the wheel out of the water after the tire has set. The pawl or dog by engaging the ratchet-teeth of the connecting-bar holds the rock-shafts against movement and locks the wheel-receiving rack in an elevated position. The wheel-receiving rack is firmly held in an elevated position while a wheel and tire are applied to it, and it may be quickly operated to carry the heated tire into the water after the tire has been applied to the wheel.

What I claim is—

1. In a tire setter and cooler, the combination of a tank, a vertically-movable wheel-rack, rock-shafts journaled on the exterior of said tank near the upper edges thereof and provided with arms extending inward over the edges of said tank, curved links pivotally connected at one end to the free ends of said arms and connected at their other ends to said wheel-rack, an operating-arm mounted on one of the rock-shafts, a rod extending from the operating-arm to an arm on the other rock-shaft, and means carried by said operating-lever and adapted to engage said connecting-rod to lock the rack in elevated position.

2. A device of the class described comprising a box or tank, a vertically-movable wheel-rack, rock-shafts mounted on the box or tank at the upper edges thereof and provided with arms connected with the rack, an operating arm or lever mounted on one of the rock-shafts, a rod connected with an arm of the other rock-shaft and pivoted to the operating arm or lever and provided with a ratchet, a dog pivoted to the operating arm or lever and engaging the ratchet of the connecting-rod, and means mounted on the operating arm or lever for operating the pawl or dog, substantially as described.

3. A device of the class described comprising a box or tank, a wheel-rack, rock-shafts mounted on the box or tank at the upper edges thereof and connected with the rack, an operating-lever mounted on one of the rock-shafts, a rod connected with an arm of the other rock-shaft and with the said lever and provided with a ratchet, a dog pivoted to the lever and arranged to engage the ratchet and provided with a hook-shaped extension arranged to engage the rod, a link pivotally mounted on the lever, means for connecting the link and the dog, and a latch-lever mounted on the said lever and connected with the link, substantially as described.

In testimony that I claim the foregoing as my own I have hereto affixed my signature in the presence of two witnesses.

SEBASTIAN SMITH.

Witnesses:
T. E. BOTTENBERG,
L. D. DIXON.